United States Patent [19]

Arpin et al.

[11] 4,326,657
[45] Apr. 27, 1982

[54] OPTICAL FIBER DISPENSER

[75] Inventors: John B. Arpin, Ocean; Sam Di Vita, West Long Branch, both of N.J.

[73] Assignee: The United States of America as represented by the Secretary of the Army, Washington, D.C.

[21] Appl. No.: 150,765

[22] Filed: May 19, 1980

[51] Int. Cl.³ .................... B65H 17/32; F42B 13/56
[52] U.S. Cl. .................... 226/97; 102/504; 242/128
[58] Field of Search ............. 226/7, 95, 97; 242/128, 242/129, 146; 254/134.4; 102/63, 89 R

[56] References Cited
U.S. PATENT DOCUMENTS

| | | | |
|---|---|---|---|
| 3,232,557 | 2/1966 | Winn, Jr. | 242/146 |
| 3,286,947 | 11/1966 | Erickson | 242/128 |
| 3,305,150 | 2/1967 | Campbell et al. | 226/97 |
| 3,703,264 | 11/1972 | Winn, Jr. | 242/129 |
| 3,826,256 | 7/1974 | Smith | 226/97 X |
| 3,837,624 | 9/1974 | Dandurand | 254/134.4 |
| 4,271,761 | 6/1981 | Canning et al. | 102/504 |

Primary Examiner—Leonard D. Christian
Attorney, Agent, or Firm—Nathan Edelberg; Jeremiah G. Murray; Edward Goldberg

[57] ABSTRACT

A dispenser for feeding an optical glass fiber from a missile to provide a communication link from the missile to the ground; the dispenser includes a supply of optical fiber and a source of pressurized gas mounted in a housing having an orifice through which the optical fiber is fed and the gas exhausted during the feeding of the optical fiber from the missile.

8 Claims, 2 Drawing Figures

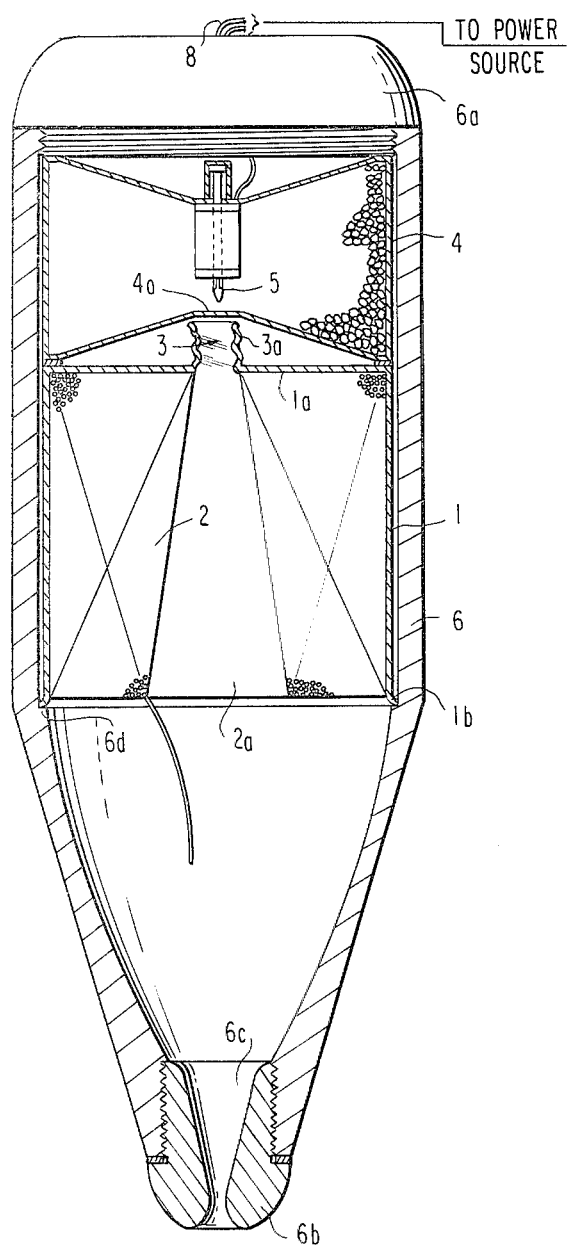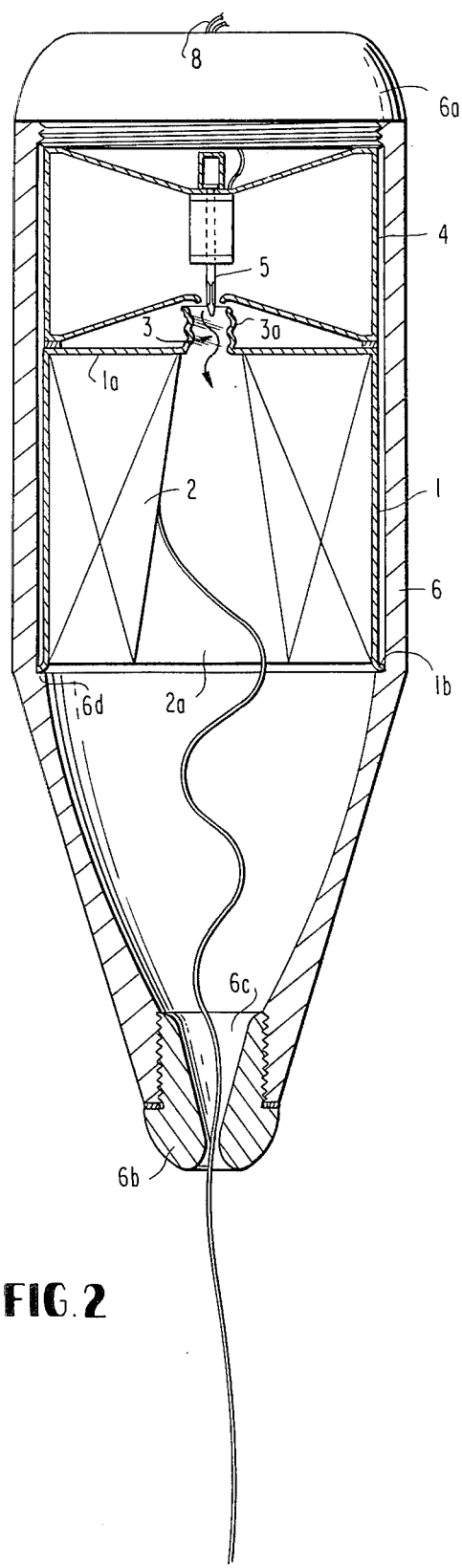

OPTICAL FIBER DISPENSER

The invention described herein may be manufactured and used by or for the Government for governmental purposes without the payment of any royalties thereon or therefor.

BACKGROUND OF THE INVENTION

In the use of optical fibers to establish communication links from one station to another, great care is required to prevent a break in the fiber as it is fed from its supply spool, to establish the desired communication link, since the diameter of an optical fiber is usually in the range of 10 to 500 microns. While the feeding of the optical fiber can be manually controlled when establishing a communication link from one ground station to another ground station, such control cannot be obtained when establishing a communication link between a ground station and an air or space station. After considerable research and experimentation, the optical fiber dispenser of the present invention has been devised to facilitate the feeding of an optical fiber from its supply to establish a communication link between a ground station and an air or space station, and to prevent the breaking of the fiber during the feeding thereof from the supply spool.

The optical fiber dispenser of the present invention comprises, essentially, a supply of optical fiber and a source of pressurized gas mounted within a housing having an orifice through which the optical fiber is fed and the gas escapes during the feeding of the optical fiber to establish a communication link between a ground station and an air or space station.

BRIEF DESCRIPTION OF THE DRAWING

FIG. 1 is a sectional, side elevational view of the optical fiber dispenser of the present invention; and FIG. 2 is a sectional, side elevational view of the optical fiber dispenser of the present invention showing the fiber being fed therefrom.

DESCRIPTION OF THE PREFERRED EMBODIMENT

Referring to the drawings, and more particularly to FIG. 1 thereof, the optical fiber dispenser of the present invention comprises, a container 1 holding a wound supply of optical fiber 2, the fiber having been previously wound on a removable conical mandrel to thereby form the conical central portion 2a from which the fiber is unwound when being fed from the dispenser. When winding the supply of optical fiber on the removable conical mandrel, the fiber is twisted 20° per turn to insure that the fiber is dispensed in a torque-free manner, free of twists and stress. The wound supply of optical fiber is also coated with paraffin which acts as an adhesive to hold the optical fiber in the desired wound form and as a lubricant to facilitate the dispensing of the fiber. The container 1 has a wall 1a at one end thereof including a neck portion 3 having a helical wall 3a which communicates with the conical central portion 2a of the supply of optical fiber 2.

A container of pressurized gas 4 is positioned adjacent the end wall 1a of the optical fiber container 1. The gas container 4 includes a solenoid actuated pin 5 for piercing a frangible wall portion 4a of the gas container 4 to allow gas to escape from the container 4 through the neck 3.

The optical fiber container 1 and gas container 4 are enclosed within a housing 6 having a threaded cap 6a at one end and a tip 6b threaded in the opposite end and having a venturi orifice 6c.

To assemble the various components of the dispenser within the housing 6, the container 1 of optical fiber is placed in the housing with the open end of the container inverted so that the peripheral edge 1b of the container becomes seated on a shoulder 6d formed on the interior wall of the housing. A suitable gasket is mounted on the end wall 1a of the fiber container 1 and the pressurized gas container 4 is then seated on the gasket. The cap 6a is then threaded onto the end of the housing with the electrical conductors 8 extending therethrough to an electrical power source.

In the operation of the optical fiber dispenser of the present invention, the dispenser is adapted to be mounted on a rocket-fired missile, and before lift-off, the free end of the optical fiber is manually pulled through the tip 6b and secured to a ground station. On lift-off, the solenoid actuated pin 5 is energized to thereby puncture the gas container wall portion 4a, as shown in FIG. 2, whereby gas is allowed to escape through the neck portion 3a, the conical central portion 2a of the optical fiber supply 2, and through the venturi 6c of the tip 6b. The helical wall 3a of the neck 3 imparts a swirling motion to the escaping gas to thereby orient the flow of gas in the direction of the paying-out of the fiber as the fiber is propelled through the orifice 6c. The gas not only assists the paying-out of the optical fiber from its supply but also functions as an air bearing for the fiber as it passes through the orifice 6c, to thereby prevent the fiber from coming into contact with the sides of the orifice.

The pressurized gas employed is carbon dioxide so that its flow from the container 4 not only propels the fiber from its supply 2 and supports the fiber through the orifice 6c whereby a minimum of stress and strain is imparted to the fiber but also the carbon dioxide functions as a coolant to prevent any excessive ambient heat from being transmitted through the walls of the housing 6 to the optical fiber.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An optical fiber dispenser adapted for mounting on a missile to be directed to a remote location from a first location for establishing a communication link between said locations comprising a housing, an orifice provided at one end of said housing, a supply of optical communication fiber mounted in said housing and wound about a central open area, the free end of a strand from the supply of optical fiber extending through said orifice and adapted to be secured externally at said first location while the supply of fiber in said housing is unwound and payed out through said orifice by movement of said missile toward said remote location, a source of pressurized gas mounted in said housing adjacent said supply of optical fiber at an end of said central area spaced from said orifice, and valve means operatively connected to said pressurized gas source for releasing the gas from said source upon lift-off of said missile allowing the gas to flow through said central area and supply of optical fiber and through said orifice around the strand of optical fiber as the fiber is unwound and payed out through said orifice, the gas escaping through said orifice forming an air bearing for the optical fiber to minimize contact with the sides of said orifice and reduce stress and strain on the optical fiber as it is dispensed from the housing.

2. An optical fiber dispenser according to claim 1, wherein the supply of optical fiber is a continuous strand wound in an annulus about said central area from which the fiber is unwound, said central area tapering outwardly from said source of gas toward said orifice.

3. An optical fiber dispenser according to claim 2, wherein the fiber is twisted 20° per turn when being wound, whereby the fiber is dispensed in a torque-free manner.

4. An optical fiber dispenser according to claim 2, wherein the supply of optical fiber is mounted in said housing within a first container having an end wall, said end wall having an open neck portion aligned with said central area of said supply of optical fiber.

5. An optical fiber dispenser according to claim 4, wherein the source of pressurized gas includes a second container having a frangible wall portion positioned adjacent said neck portion of said first container, said valve means including a solenoid actuated pin operatively connected to said gas container for piercing said frangible wall upon lift-off of said missile to thereby allow the gas to escape through said neck portion and said central area of said supply of optical fiber.

6. An optical fiber dispenser according to claim 5, wherein the neck portion is provided with a helical wall to thereby impart a swirling motion to the escaping gas and direct the flow of gas toward said orifice paying-out said fiber.

7. An optical fiber dispenser according to claim 1, wherein the orifice comprises a venturi formed in a tip threaded into the end of said housing.

8. An optical fiber according to claim 2 wherein said wound supply of optical fiber includes a coating of paraffin holding the optical fiber in said annulus and providing a lubricant to facilitate dispensing of the fiber.

* * * * *